United States Patent
Lin et al.

(10) Patent No.: US 6,720,917 B2
(45) Date of Patent: Apr. 13, 2004

(54) ACQUISITION FOR GPS C/A CODE AND P (Y) CODE

(75) Inventors: David M. Lin, Beavercreek, OH (US); James B. Y. Tsui, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 676 days.

(21) Appl. No.: 09/729,628

(22) Filed: Dec. 4, 2000

(65) Prior Publication Data

US 2002/0069016 A1 Jun. 6, 2002

(51) Int. Cl.[7] .............................................. H04B 7/185
(52) U.S. Cl. ............................. 342/357.06; 342/357.12
(58) Field of Search ....................... 342/357.05, 357.06, 342/357.12, 357.15

(56) References Cited

U.S. PATENT DOCUMENTS

| | | | |
|---|---|---|---|
| 5,982,811 A | 11/1999 | Harrison et al. | ............ 375/208 |
| 5,987,059 A | 11/1999 | Harrison et al. | ............ 375/208 |
| 6,009,118 A | 12/1999 | Tiemann et al. | ............ 375/208 |
| 6,028,883 A | 2/2000 | Tiemann et al. | ............ 375/200 |
| 6,028,887 A | 2/2000 | Harrison et al. | ............ 375/206 |
| 6,567,042 B2 * | 5/2003 | Lin et al. | ............ 342/357.12 |
| 2001/0033606 A1 * | 10/2001 | Akopian et al. | ............ 375/149 |
| 2002/0064210 A1 * | 5/2002 | Sullivan | ............ 375/145 |

* cited by examiner

*Primary Examiner*—Dao Phan
(74) *Attorney, Agent, or Firm*—Gina S. Tollefson; Gerald B. Hollins; Thomas L. Kundert

(57) ABSTRACT

An improved global positioning system satellite signal acquisition method. The method of the invention reduces the number of operations in the block correlation used in determining Doppler frequency and time of the received GPS C/A or P(Y) codes. Reducing the number of operations in block correlation increases acquisition speed making it conducive to commercial and military GPS receivers

4 Claims, 3 Drawing Sheets

ACQUISITION FOR GPS C/A CODE AND P (Y) CODE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to global positioning system (GPS) satellite signal acquisition and more specifically to a faster computation algorithm for GPS P(Y) code and multiple blocks C/A code satellite signal acquisition.

The nominal GPS operational constellation consists of 24 satellites that orbit the earth in 12 hours. The control segment consists of tracking stations located around the world. The GPS user segment consists of the GPS receivers and the user community. GPS provides specially coded satellite signals that can be processed in a GPS receiver, enabling the receiver to compute velocity, time and position.

The GPS satellites transmit two microwave carrier signals. FIG. 1 is a prior art drawing of GPS signals. The L1 frequency (1575.42 MHz) shown at 100 carries the navigation message. The L2 frequency represented at 105 (1227.60 MHz) is used to measure the ionospheric delay by precise positioning service equipped receivers. Three binary codes shift the L1 and/or L2 carrier phase.

The Coarse Acquisition Code (C/A) shown at 102 modulates the L1 carrier phase. The C/A code is a repeating 1 MHz Pseudo Random Noise (P-CODE) Code. This noise-like code modulates the L1 carrier signal, "spreading" the spectrum over a 1 MHz bandwidth. The C/A code repeats every 1023 bits (one millisecond). There is a different C/A code P-CODE for each GPS satellite. GPS satellites are often identified by their P-CODE number, the unique identifier for each pseudo-random-noise code. The C/A code that modulates the L1 carrier is the basis for the civil standard positioning service (SPS).

The P-Code (Precise) shown at 104 modulates both the L1 and L2 carrier phases. The P-Code is a very long (seven days) 10 MHz P-CODE code. In the Anti-Spoofing (AS) mode of operation, the P-Code is encrypted into the Y-Code. The encrypted Y-Code requires a classified AS Module for each receiver channel and is for use only by authorized users with cryptographic keys. The P (Y)-Code is the basis for the precise positioning service (PPS).

The navigation message shown at 103 also modulates the L1-C/A code signal. The Navigation Message is a 50 Hz signal consisting of data points that describe the GPS satellite orbits, clock corrections, and other system parameters.

The C/A code and P(Y) code are code division multiple access (CDMA) systems where a pair of unique signals are assigned to each satellite in the GPS phase of the C/A code or the P(Y) code. The GPS receiver applies correlation to measure timing. The received signal is correlated with the locally generated replicas of the selected satellite's signal. This process is called acquisition. The traditional GPS receiver acquires this phase by continuous sliding, multiplication, and addition. This process is time consuming and is not conducive to miniaturized receivers. The C/A code is used in civilian GPS receivers and the military GPS receivers use both C/A code and P(Y) code. In general, the military receiver acquires the C/A code and transfers this timing to P(Y) code for tracking. However, if the military GPS receiver is under a hostile environment and exposed to a strong jamming threat, the less vulnerable direct P(Y) acquisition becomes necessary. The present invention applies to both the C/A code and the P(Y) code to improve the acquisition speed.

The conventional P(Y) code acquisition uses a time domain correlation approach as shown in FIG. 2. For each satellite, this approach correlates 10 ms of received sampled data (500,000 data points), represented at 200 with 200 locally generated replica, represented at 201. These replica are represented by $$r(m) = P_j(m\Delta t) \exp(j2\pi f_k m \Delta t) \qquad (1)$$

where $\Delta t$ is sampling interval, $P_j(m\Delta t)$ is the sampled P(Y) code of satellite j, m=0, 1, 2, . . . , 49,999 is a time index, and, $f_k$ is the center frequency of the locally generated replica. To acquire the P(Y) code of the received signal from a targeted satellite, 200 locally generated replica are correlated with 500,000 sampled points of the received signal. If any of these 200 correlation result is above the threshold which is pre-determined by the correlation noise floor statistics, the code and the carrier frequency acquisition is completed, as is represented at 202. If none of the results is above the threshold, another 500,000 sampled data points will be processed in the same manner, as represented at 203. This new 500,000 point data set, represented at 204, only shifts one data point from the previous one. This process continues until either a signal is found or the preselected search time is exhausted. For ±1 ms of search time, the average amount of mathematical operations is 200×50000 500000-point correlation, making the known approach a time consuming and energy consuming operation.

SUMMARY OF THE INVENTION

The present invention is an improved global positioning system satellite signal acquisition method. The method of the invention reduces the number of operations in the block correlation used in determining Doppler frequency and time of the received GPS C/A or P(Y) codes. Reducing the number of operations in block correlation increases acquisition speed making it conducive to commercial and military GPS receivers. Since the application of this invention to C/A code GPS receiver acquisition and to the P(Y) code GPS receiver acquisition is the same and P(Y) code is non-repetitive, for simplicity purposes, only the P(Y) code GPS receiver acquisition is described.

It is therefore an object of the invention to provide GPS receiver acquisition software which processes GPS data for faster, more efficient computation.

It is another object of the invention to provide faster, more efficient data acquisition with time-domain based software.

These and other objects of the invention are described in the description, claims and accompanying drawings and are achieved by an efficient, data processing minimizing, GPS data acquisition software method comprising the steps of:

separating first N data points from a received GPS signal into first M subdivisions, a subdivision representing a preselected number of P(Y) data points from said received GPS signal;

dividing second N data points from said locally generated replica P(Y)-code into second M subdivisions, a subdivision representing a preselected number of P(Y) data points from said locally generated replica, said second M subdivisions corresponding with said first M subdivisions from said separating step;

correlating data from said first M subdivisions from said separating step with data from said second M subdivisions from said dividing step, said correlating including the steps of multiplying received P(Y) code with locally generated replica P(Y) code and then performing a summing operation resulting in third M data points;

performing an M-point fast Fourier transform on said third M data points from said multiplying step;

comparing a product from said performing step with a preselected threshold value; and repeating said correlating step until said preselected threshold from said considering step is satisfied.

DETAILED DESCRIPTION

The present invention improves the acquisition speed of both GPS C/A code and P(Y) code. The acquisition speed is increased by decreasing the number of data operations. That is, data points are grouped together in subdivisions and considered as an average value, thus a fast Fourier transform can be applied to the reduced data set. Since the application of this invention to C/A code GPS receiver acquisition and to the P(Y) code GPS receiver acquisition is the same and P(Y) code is non-repetitive, for simplicity purposes, only the P(Y) code GPS receiver acquisition is described.

Figure 1:
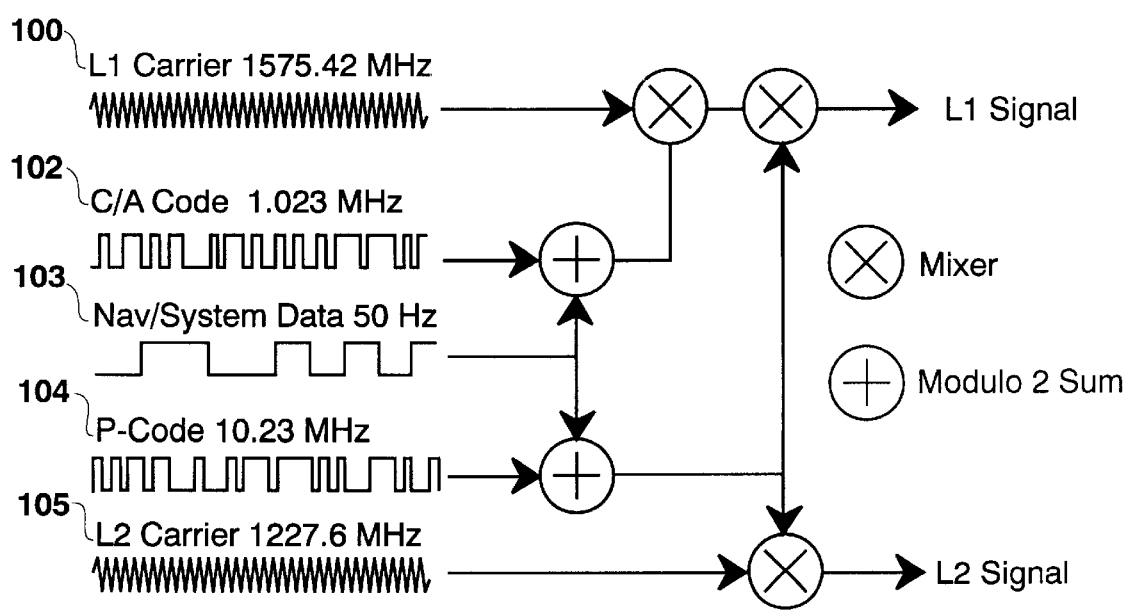
FIG. 1 is a prior art description of GPS satellite signals.
Figure 2:
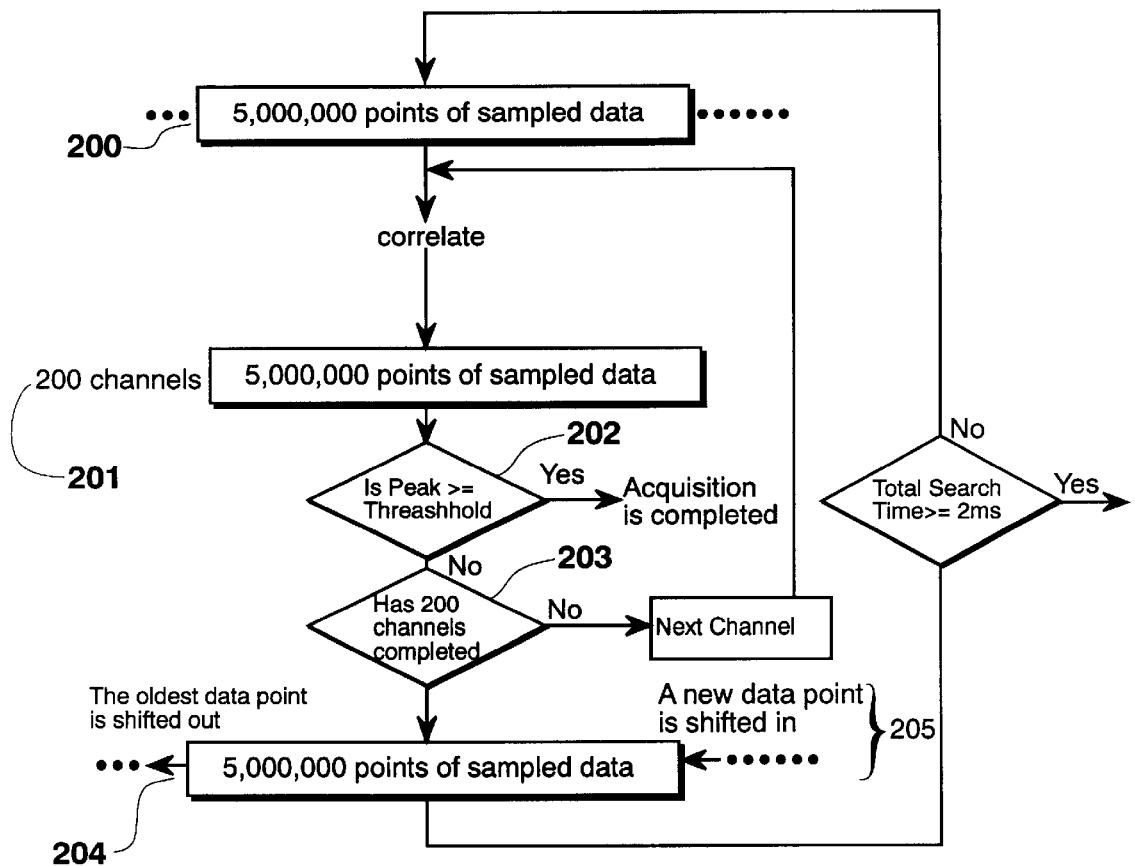
FIG. 2 shows a prior art conventional time domain approach for a GPS receiver.
Figure 3:
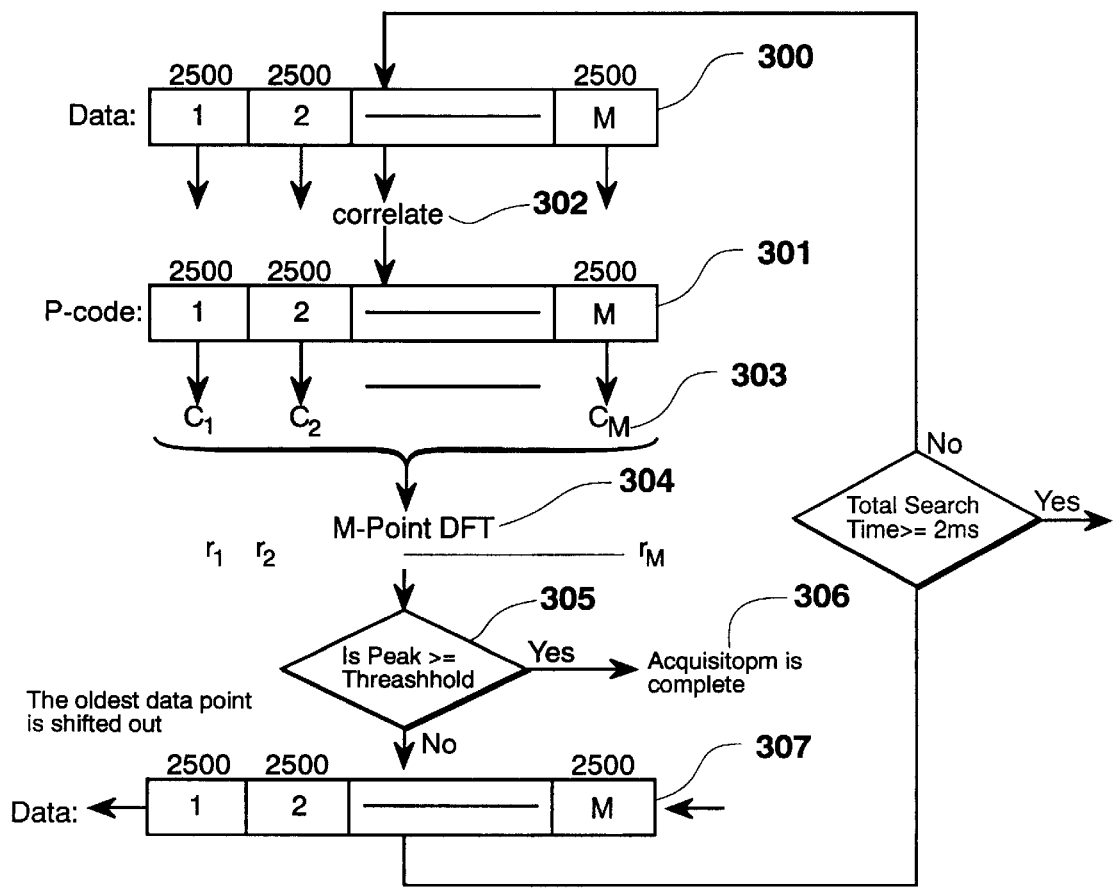
FIG. 3 shows a data acquisition scheme for a GPS receiver according to the invention.

A flow graph of the acquisition software illustrating the sequence of data processing is shown in FIG. 3. The invention uses the time domain to find correlation and fast Fourier transform(FFT) to find frequency.

In the illustrated arrangement, the radio frequency signals are down converted to 37.25 Mhz, filtered with 20 Mhz bandwidth band-pass filter, and sampled at 50 MHz. These sampled data points are further down converted to base band complex I (in-phase) and Q (quadrature-phase) signal by software.

The FIG. 3 arrangement of the invention assumes the received GPS signal comprises 500,000 sampled data divided into M subdivisions, represented at 300. The size of the subdivision is variable and based on the total Doppler coverage. For ±10 KHz Doppler coverage and 100 Hz Doppler resolution, the total Doppler bins are M=200 (20 KHz/100 Hz), which is also the number of subdivisions for the reason explained later. For M=200 and N=500,000, the size of each subdivision is K=N/M=2500 points. The corresponding locally generated N points of sampled P-code replica data are also divided into M blocks, represented at 301. M blocks of P-code replica are block-by-block correlated with M blocks of data, represented at 302. The results are M points correlated data, represented at 303.

In correlation process, if the sampled data and code are lined up, the P(Y) code will be stripped off. Because the correlation is an averaging process, it will filter out the high frequency (<−10 KHz and >10 KHz) components, which includes noise, correlated and cross correlated results, and reveal M-point low frequency (<±10 KHz) sampled sinusoidal data. Since M is equal to the Nyquest sampling rate for complex signals with frequency contain less than 10 KHz, this gives the reason why M subdivisions are selected.

The fast Fourier transform is applied to these M points correlated data. The peak of the result is compared with a preselected threshold value, such comparison represented at 305. If it is above the threshold the acquisition is accomplished, represented at 306 and the time and Doppler frequency are determined. Otherwise, the next set of N data points is formed by shifting one subdivision, as opposed to shifting a single data point as is done in prior art systems, and the whole process is repeated, represented at 307. For ±1 ms of data search time, on the average, 50,000 iterations are needed. This approach uses the M point fast Fourier transform to find frequency and therefore, it requires only 1 replica rather than 200.

In summary, the present invention improves the acquisition speed of both GPS C/A code and P(Y) code. The acquisition speed is increased by decreasing the number of data operations. While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. An efficient, data processing minimizing, GPS data acquisition software method comprising the steps of:

separating first N data points from a received GPS signal into first M subdivisions, a subdivision representing a preselected number of P(Y) data points from said received GPS signal;

dividing second N data points from said locally generated replica P(Y)-code into second M subdivisions, a subdivision representing a preselected number of P(Y) data points from said locally generated replica, said second M subdivisions corresponding with said first M subdivisions from said separating step;

correlating data from said first M subdivisions from said separating step with data from said second M subdivisions from said dividing step, said correlating including the steps of multiplying received P(Y) code with locally generated replica P(Y) code and then performing a summing operation resulting in third M data points;

performing an M-point fast Fourier transform on said third M data points from said multiplying step;

comparing a product from said performing step with a preselected threshold value; and repeating said correlating step until said preselected threshold from said considering step is satisfied.

2. The method of claim 1 wherein said separating step further comprises the step of separating N data bits from a received GPS signal into M Doppler coverage dependent subdivisions.

3. The method of claim 1 further comprising the step of determining the time and Doppler frequency of said received GPS signal from said separating step.

4. The method of claim 1 further including the step of identifying a low frequency signal containing M samples representing the received GPS signal.

* * * * *